United States Patent Office
3,704,253
Patented Nov. 28, 1972

3,704,253
13 - POLYCARBONALKYL - 16 - METHYLGONA-1,3,5(10)-TRIENES AND 13-POLYCARBONALKYL-16-METHYLGON - 4 - EN-3-ONES AND INTERMEDIATES FOR THEIR PRODUCTION
Reinhardt P. Stein, Conshohocken, and Herchel Smith, Bryn Mawr, Pa., assignors to American Home Products Corporation, New York, N.Y.
No Drawing. Continuation-in-part of application Ser. No. 852,455, Aug. 22, 1969, which is a continuation-in-part of abandoned application Ser. No. 818,126, Apr. 21, 1969, which in turn is a continuation-in-part of abandoned application Ser. No. 767,809, Oct. 15, 1968. This application Sept. 23, 1970, Ser. No. 74,892
Int. Cl. C07c 167/20
U.S. Cl. 260—397.4                      5 Claims

ABSTRACT OF THE DISCLOSURE

Novel 13 - polycarbonalkyl - 16-methylgona-1,3,5(10)-trienes and 13-polycarbonalkyl-16-methylgon-4-en-3-ones and intermediates for their production are described which are pharmacologically active as estrogens and progestins respectively. Novel processes for their production are also described.

---

This application is a continuation-in-part of application Ser. No. 852,455 filed Aug. 22, 1969, which is a continuation-in-part of Ser. No. 818,126, filed Apr. 21, 1969, now abandoned, which was a continuation-in-part of Ser. No. 767,809, filed Oct. 15, 1968, now abandoned.

This invention is concerned with the preparation of novel 13-polycarbonalkyl-16-methylgon-4-en-3-ones, partially by processes described in the literature and partially by novel processes. These processes lead to compounds which have hormonal activity as estrogens and antilipemics (gona-1,3,5(10)-trienes) or as progestins and anti-estrogens (gon-4-en-3-ones).

This invention includes within its scope, compounds of Formula A and Formula B

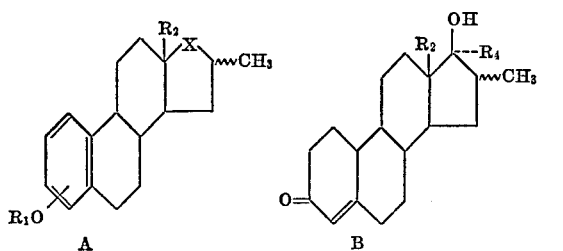

wherein $R_1$ is selected from the group consisting of lower alkyl and cycloalkyl; $R_2$ is polycarbonalkyl and $R_4$ is selected from the group consisting of ethyl, ethynyl and hydrogen; X is selected from the group consisting of

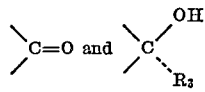

wherein $R_3$ is selected from the group consisting of ethynyl, ethyl and hydrogen.

The invention also includes the intermediate compound of Formula C:

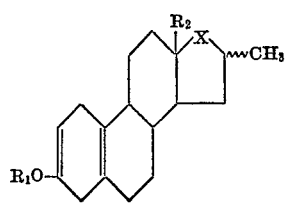

wherein $R_1$ and $R_2$ and X are the same as hereinabove described.

The following reaction scheme represents the initial phase of method by which the compounds of the invention are prepared:

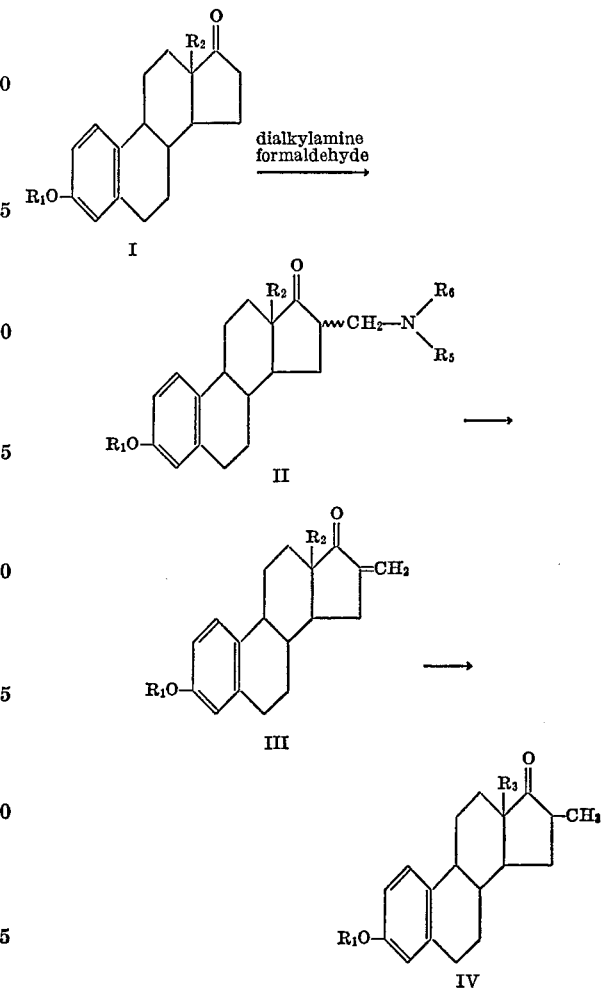

wherein $R_1$ is selected from the group consisting of (lower)alkyl and cycloalkyl; $R_2$ is polycarbonalkyl; $R_5$ and $R_6$ are (lower)alkyl.

Initially, the first important intermediates are synthesized by subjecting the ketone I to a Mannich reaction by refluxing with paraformaldehyde and the appropriate dialkylamine hydrochloride in dioxane. Generally the particular solvent is not critical and higher boiling alcohols such as isoamyl alcohol may be employed. The reaction is refluxed in an apparatus equipped with a means for removing water such as a Soxhlet extractor equipped with molecular sieves to produce the corresponding 16-dialkylaminomethyl derivatives, II. If desired, the latter compounds may be isolated by an acidic work up procedure or the reaction mixture may be worked up by treatment with base to promote complete elimination of any traces of the dialkylamine, thus yielding the 16-methylene derivatives, III. However, the compounds of Formula II in addition to being useful as intermediates, have useful pharmacological activity as amebicides and trichomonacides. The compounds of Formula III may be catalytically hydrogenated to yield the 13 - polycarbonalkyl - 16β-methyl-3-methoxygona-1,3,5(10)-trien-17-ones of Formula IV.

The following reaction scheme illustrates the preparation of additional compounds within the scope of the invention:

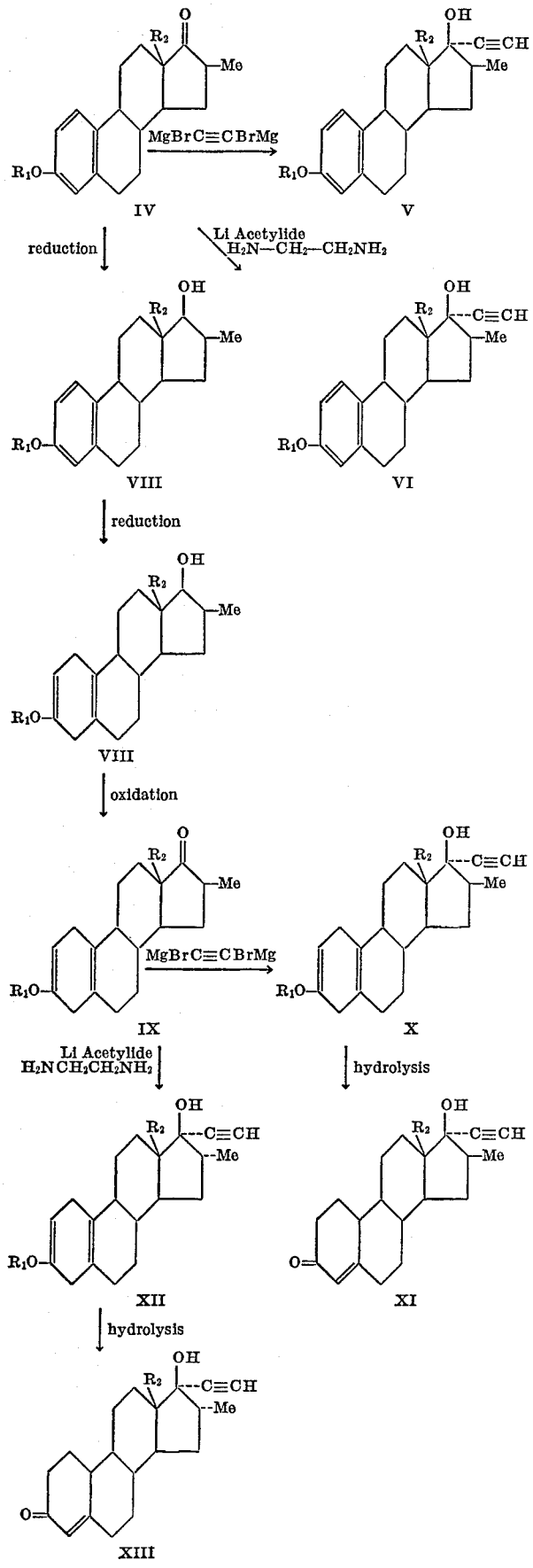

wherein $R_1$ and $R_2$ are the same as hereinabove described.

The instant invention also provides a method of conveniently preparing, in good yield, 16α-methyl-17α-ethynyl-ols and 16β-methyl-17α-ethynyl-ols. The compounds of Formula IV can be utilized as starting materials and the 16α or 16β compounds may be obtained by the selective use of particular ethynylating reagents.

Unexpectedly and surprisingly, we have been able to obtain the 16α-methyl compounds of Formula VI by employing lithium acetylide-ethylene diamine complex in dimethyl sulfoxide, dimethylformamide or dimethylacetamide when ethynylating a compound of Formula IV. The use of bismagnesium bromoacetylide in an aprotic organic solvent yields the 16β-methyl-17α-ethynylols of Formula V and a trace amount of the epimeric compounds of Formula VI. The purification of the 16β compound is not difficult and may be accomplished by conventional chromatographic techniques.

The production of 16α or 16β methyl progestins is accomplished by modification of the procedures outlined above. Thus, the 16β-methyl-17-ones (IV) are reduced with a hydride reagent such as lithium aluminum tritertiary butoxy hydride to give the corresponding 16β-methyl-17β-ols (VII). A further reduction under Birch conditions gives the 3-alkoxygona-2,5(10)-dienes (VIII). Oxidation of the latter compounds is done under the mild conditions of DMSO-acetic anhydride to give the corresponding 16β-methyl-17-ones (IX). Other methods of oxidation are considered unsuitable either because of the sensitivity of the 3-alkoxy-2,5(10)-dien moiety or because of the possibility of causing equilibration of the 16-methyl group thus producing an undesirable mixture of the 16-methyl α and β epimers. The 16β-methyl-17-ones (IX), by reaction with lithium acetylide-ethylene diamine complex in DMSO yields 16α-methyl-17-ethynyl compounds of Formula XII. These compounds upon acidic hydrolysis give the orally active progestins of Formula XIII. Treatment of the 16β-methyl-17-ones (IX) with bismagnesium-bromoacetylide in a refluxing aprotic organic solvent such as tetrahydrofuran, dioxane, ethers, benzene, toluene and the like, yields the corresponding 17α-ethynyl compounds (X) which upon acidic hydrolysis yields the 16β-methyl substituted, orally active progestins of Formula XI.

The invention also contemplates the use of certain of the compounds of the invention as intermediates for the preparation of other pharmacological action compounds. The following reaction scheme illustrates another aspect of the invention.

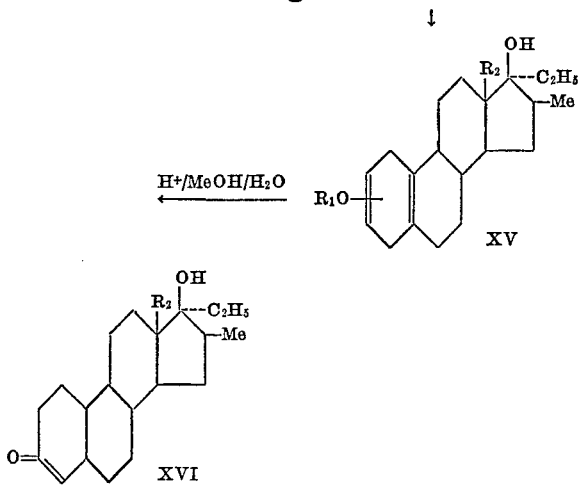

$R_1$, $R_2$ are the same as hereinabove described.

As described above, compounds of Formula V may be treated with hydrogen in the presence of a palladium catalyst to obtain compounds of Formula XIV. These compounds are then reduced to obtain compounds of XV. Subsequent hydrolysis of compounds of Formula XV yields the androgenic and anabolic compounds of Formula XVI. This flow sheet has been used to describe the 16β-methyl type compounds, but by methods which are completely analogous to those employed above, the epimeric 16α-methyl compounds may also be obtained.

Intermediate compounds of Formula VIII which are described above may also be hydrolyzed to obtain the new and novel androgenic and anabolic compounds of Formula XVII according to the following reaction scheme:

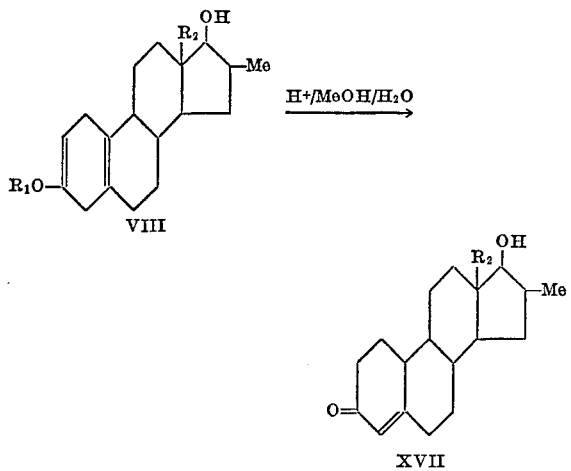

$R_1$ and $R_2$ are the same as hereinabove described.

As used herein and in the appended claims the term (lower)alkyl contemplates straight and branched chain hydrocarbon radicals which include methyl, ethyl, propyl, i-propyl, n-hexyl and the like. The term cycloalkyl is used to include cycloaliphatic radicals containing 3 to about 7 carbon atoms. The term "polycarbonalkyl" is used to denote alkyl groups containing from 2 to about 18 carbon atoms. The symbol Me is used to indicate a methyl substituent.

The compounds of Formula XIII and Formula XI when tested in vivo have produced divergent results in standard pharmacological procedures. Compounds of Formula XI have been found to have very high anti-estrogen activity and low progestational activity while compounds of Formula XIII have low anti-estrogen activity and high progestational activity.

The compounds of Formula XIII and Formula XI have been tested for anti-estrogenic activity as follows:

2 μg. of estrone are administered subcutaneously simultaneously with the test compound to female mice in four equal parts over four days. Vaginal smears are taken on the afternoon of day five and morning of day six. Active compounds reduce the proportion of mice responding to the estrone with cornified vaginal epithelia. Progesterone is used as a standard with a rating of 100%. The compound of Formula XIII when administered subcutaneously at a dose of 1 mg. had an anti-estrogenic rating of 100%. The compound of Formula XI when administered in the same manner had an anti-estrogenic rating of 100% at a dosage level of 400 μg.

The compounds of Formula XIII and Formula XI were also tested for their progestational activity as follows:

Immature female rabbits are primed by the subcutaneous injection of 5 μg. of 17β-estradiol for six days. The primed rabbits then received test compound by subcutaneous injection daily for five days before autopsy on the sixth. Progestational activity is assessed by histological evaluation of uterine glandular proliferation. Progesterone is employed as a standard with a rating of 100%. The compound of Formula XIII at a subcutaneous dose of 85 μg. had a rating of 140% while the compound of Formula XI had a rating of 50% at a subcutaneous dosage of 250 μg.

Thus the compounds are useful for the induction of selective hormonal effects. For example, the high anti-estrogen-low progestogen compound of Formula XI may be employed for the prevention of conception by the administration of a continuous dosage regimen and the compound of Formula XIII may be used as the progestogen component of a progestogen-estrogen cyclic contraceptive composition.

EXAMPLE 1 dl-13-ethyl-3-methoxy-16ξ-(dimethylaminoethyl)gona-1,3,5(10)-trien-17-one

Reflux a mixture of 5.0 g. of dl-13-ethyl-3-methoxy-gona-1,3,5(10)-trien-17-one, 4.0 g. of paraformaldehyde, 12.0 g. of dimethylamine hydrochloride and 150 ml. of isoamyl alcohol for two hours. Cool and remove the solvent under vacuum. Digest the residue with dilute hydrochloric acid and extract well with chloroform. Dry and evaporate the extract in vacuo then triturate the residue with ether and filter to get 2.03 g. of solid, M.P. 190–192°. Combine the solid with a solution of potassium carbonate (3.0 g.) in water (100 ml.) and warm on the stream bath for 10 minutes. Cool and extract the mixture with ether. Wash, dry and evaporate the extract in vacuo and crystallize the resulting oil from methanol to obtain 0.84 g. of title product, M.P. 101–103° and second crops of 0.52 g., M.P. 123–124°. Combine the solids in methylene chloride, treat with decoloring charcoal, filter and remove the solvent in vacuo. Crystallize the oil from methanol to obtain 1.03 g. of the pure title product, M.P. 126–129°

$\lambda_{max.}^{KBr}$ 5.80μ

Analysis.—Calcd. for $C_{23}H_{33}O_2N$ (percent): C, 77.70; H, 9.36; N, 3.94. Found (percent): C, 77.48; H, 9.45; N, 4.13.

By analogous methods the following compounds are prepared:

dl-13-n-propyl-3-ethoxy-16ξ(diethylaminomethyl)gona-1,3,5(10)-trien-17-one dl-13-n-nonyl-3-propoxy-16ξ(diethylaminomethyl)gona-1,3,5(10)-trien-17-one dl-13-n-dodecenyl-3-ethoxy-16ξ(n-propyl aminomethyl)gona-1,3,5(10)-trien-17-one dl-13-n-propyl-3-cyclopentyloxy-16ξ(diethylaminomethyl)gona-1,3,5(10)-trien-17-one dl-13-ethyl-3-cycloheptyloxy-16ξ(diethylaminomethyl)gona-1,3,5(10)-trien-17-one

EXAMPLE 2

*dl*-13-ethyl-3-methoxy-16-methylenegona-1,3,5(10)-trien-17-one

Reflux a mixture of 40.0 g. of *dl*-13-ethyl-3-methoxygona-1,3,5(10)-trien-17-one, 15.0 g. of paraformaldehyde, 60.0 g. of dimethylamine hydrochloride and 500 ml. of dry dioxane into a Soxhlet extractor charged with $\frac{1}{16}$ inch No. 4A molecular sieves for 2 hours. Add another 15.0 g. of paraformaldehyde and continue refluxing for 3 hours. Cool and remove the solvent in vacuo. Digest the residue with a solution of potassium carbonate (120 g.) in water (600 ml.) then extract well with ether-methylene chloride (using enough ether to keep the organic layer less dense than the aqueous layer). Wash, dry and evaporate the extract in vacuo, then crystallize the residue from methanol to obtain 37.0 g. of title product, M.P. 142–145°. Obtain an analytical sample from absolute ethanol, M.P. 146–148°

$\lambda_{max.}^{KBr}$ 5.81 and 6.09$\mu$, $\lambda_{max.}^{EtOH}$ 225 m$\mu$ ($\epsilon$ 15,200).

*Analysis.*—Calcd. for $C_{21}H_{26}O_2$ (percent): C, 81.25; H, 8.44. Found (percent): C, 81.06; H, 8.36.

By analogous methods the following compounds are prepared:

*dl*-13-n-butyl-3-ethoxy-16-methylene gona-1,3,5(10)-trien-17-one

*dl*-13-n-heptadecyl-3-ethoxy-16-methylene gona-1,3,5(10)-trien-17-one

*dl*-13-ethyl-3-cyclobutyloxy-16-methylene gona-1,3,5(10)-trien-17-one.

EXAMPLE 3

*dl*-13-ethyl-3-methoxy-16β-methylgona-1,3,5(10)-trien-17-one

Pre-treat a mixture of 5% palladium on carbon (1.0 g.) and absolute ethanol (50 ml.) with hydrogen at one atmosphere then add a solution of 3.00 g. of *dl*-13-ethyl-3-methoxy-16-methylenegona-1,3,5(10)-trien-17 - one in 200 ml. of ethanol tetrahydrofuran and continue to treat with hydrogen until uptake of one equivalent of the gas is complete. Filter and evaporate the solvent in vacuo. Treat the residue in methylene chloride with decolorizing charcoal, filter and replace the solvent with ethanol by boiling. Let stand to complete crystallization the filter to obtain 2.67 g. of the pure title product, M.P. 146–150°

$\lambda_{max.}^{KBr}$ 5.78$\mu$

By analogous methods the following compounds are prepared:

*dl*-13-n-pentyl-3-cyclopentyloxy-16β-methylgona-1,3,5(10)-trien-17-one

*dl*-13-ethyl-3-cyclopropyloxy-16β-methylgona-1,3,5(10)-trien-17-one.

EXAMPLE 4

*dl*-13-ethyl-17α-ethynyl-3-methoxy-16α-methylgona-1,3,5(10)-trien-17β-ol

Dissolve 10.0 g. *dl*-13-ethyl-3-methoxy-16β-methylgona-1,3,5(10)-trien-17-one in 100 ml. of benzene and 250 ml. of dry dimethylsulfoxide; then bubble purified acetylene gas through the solution for one hour. Add lithium acetylide-ethylene diamine complex (5.0 g.) and stir the solution under acetylene for one hour. Add 5.0 g. more of the reagent complex and stir a further one hour under acetylene. Pour the reaction into ice-water, extract with ether then wash, dry and evaporate the ether in vacuo. Add ether and let stand at 10° C. then filter the dimeric by-product. Evaporate the filtrate in vacuo, dissolve the oil in a small amount of methanol and let stand. Filter off a trace amount of starting material then evaporate the filtrate in vacuo and pump the resulting oil under high vacuum. Dissolve the oil in a small amount of ether and scratch to induce crystallization. Let stand until crystallization is complete then add heptane and triturate the solid. Filter to obtain 5.6 g. of the total product, M.P. 108–111°. Obtain an analytical sample from heptane, M.P. 124–127°

$\lambda_{max.}^{KBr}$ 2.92 and 3.08$\mu$

*Analysis.*—Calcd. for $C_{23}H_{30}O_2$ (percent): C, 81.61; H, 8.93. Found (percent): C, 81.47; H, 8.68.

By analogous methods the following compounds are obtained:

*dl*-13-n-hexyl-17α-ethynyl-3-cyclohexyloxy-16α-methyl-gona-1,3,5(10)-trien-17β-ol

*dl*-13-n-tetradecyl-17α-ethynyl-3-cyclopentyloxy-16α-methylgona-1,3,5(10)-trien-17β-ol

*dl*-13-n-octyl-17α-ethynyl-3-ethoxy-16α-methylgona-1,3,5(10)-trien-17β-ol

*dl*-13-n-heptyl-17α-ethynyl-3-propoxy-16α-methylgona-1,3,5(10)-trien-17β-ol

EXAMPLE 5

*dl*-13-ethyl-17α-ethynyl-3-methoxy-16β-methylgona-1,3,5(10)-trien-17β-ol

Equip a flask with a stirrer, a gas bubbler and a condenser with a drierite tube at the outlet. Charge the flask with dry tetrahydrofuran (400 ml.) then add 3 molar ethereal methyl magnesium bromide (125 ml.). Bubble acetylene gas through the stirred solution for three hours then add 6.00 g. of *dl*-13-ethyl-3-methoxy-16β-methylgona-1,3,5(10)-trien-17-one. Reflux the reaction under acetylene for four hours. Cool and let the reaction stand overnight. Pour the reaction into ice-cold 20% aqueous ammonium chloride solution. Extract well with ether then wash, dry and evaporate the ether in vacuo. Dissolve the resulting oil in benzene and pass the solution through a column of fluorosilicate. Remove the benzene in vacuo. Dissolve the resulting oil in 10% ether in heptane and pass the solution through a short column of fluorosilicate and remove the solvent in vacuo. Dissolve the oil in methanol then chill and scratch to induce crystallization. Filter to get 1.20 g. of title product, M.P. 50–55°. Dissolve the solid in methylene chloride, treat with decolorizing charcoal and filter. Remove the methylene chloride in vacuo and dissolve the oil in methanol. Chill, seed and dilute slowly with water. Filter to obtain 1.12 g. of pure title product, M.P. 75–78°

$\lambda_{max.}^{KBr}$ 2.89 and 3.06$\mu$

*Analysis.*—Calcd. for $C_{23}H_{30}O_2$ (percent): C, 81.61; H, 8.93. Found (percent): C, 81.83; H, 8.84.

Similarly the following compounds are prepared:

*dl*-13-n-propyl-17α-ethynyl-3-cyclobutyloxy-16β-methyl-gona-1,3,5(10)-trien-17β-ol

*dl*-13-n-hexyl-17α-ethynyl-3-ethoxy-16β-methylgona-1,3,5(10)trien-17β-ol

*dl*-13-n-butyl-17α-ethynyl-3-propoxy-16β-methylgona-1,3,5(10)trien-17β-ol

EXAMPLE 6

*dl*-13-ethyl-3-methoxy-16β-methylgona-1,3,5(10)-trien-17β-ol

Cool a solution of lithium aluminum tri-tertiary butoxyhydride (3.0 g.) in tetrahydrofuran (150 ml.) with an ice-methanol bath then add 2.00 g. of *dl*-13-ethyl-3-methoxy-16β-methylgona-1,3,5(10)-trien - 17 - one. Stir the cool solution for a total of 20 hours letting the ice-bath warm to room temperature. Add water (20 ml.) then 10% aqueous acetic acid (100 ml.) then remove the tetrahydrofuran in vacuo. Extract the resulting mixture with ether then wash, dry and evaporate the extract in vacuo. Crystallize the resulting oil from hexane and filter to obtain 1.81 g. of the title product, M.P. 124–126°. Dissolve the solid in methylene chloride, treat with decolorizing charcoal and filter. Remove the solvent in vacuo and crystallize the oil from hexane to get 1.43 g. of the pure title product, M.P. 127–129°

$\lambda_{max.}^{KBr}$ 2.8μ

Analysis.—Calcd. for $C_{21}H_{30}O_2$ (percent): C, 80.21; H, 9.62. Found (percent): C, 80.18; H, 9.41.

EXAMPLE 7 dl-13-ethyl-3-methoxy-16β-methylgona-2,5(10)-dien-17β-ol

To a solution of 9.20 g. of dl-13-ethyl-3-methoxy-16β-methylgona-1,3,5(10)-trien-17β-ol in 250 ml. of dry tetrahydrofuran and 160 ml. of 1-methoxy-2-propanol add 1 L of freshly distilled liquid ammonia followed by 200 ml. more of dry tetrahydrofuran. Stir and add lithium metal (15 g.) in small pieces at a rate to avoid vigorous reflux of the ammonia. Stir for one hour more after complete addition then add absolute ethanol dropwise until the blue color is discharged. Carefully add ammonium chloride (80.0 g.) in small portions followed by warm water to evaporate the ammonia and bring the mixture up to room temperature. Extract with ether then wash, dry and evaporate the extract in vacuo. Triturate the solid with hexane and filter to get 7.0 g. of title product, M.P. 145–150°

$\lambda_{max.}^{KBr}$ 2.93μ

Analysis.—Calcd. for $C_{21}H_{32}O_2$ (percent): C, 79.70; H, 10.19. Found (percent): C, 79.55; H, 10.11.

By analogous methods, the following compounds are prepared:

dl-13-n-propyl-3-ethoxy-16β-methylgona-2,5(10)-dien-17β-ol dl-13-n-butyl-3-cyclopentyloxy-16β-methylgona-2,5(10)-dien-17β-ol dl-13-n-nonyl-3-propoxy-16β-methylgona-2,5(10)-dien-17β-ol

EXAMPLE 8 dl-13-ethyl-3-methoxy-16β-methylgona-2,5(10)-dien-17-one

Dissolve 1.00 g. of dl-13-ethyl-3-methoxy-16β-methylgona-2,5(10)-dien-17β-ol in 20 ml. of dimethylsulfoxide and acetic anhydride (4 ml.) and let the reaction stand at room temperature for 22 hours. Pour the mixture into saturated sodium bicarbonate solution (250 ml.) and shake the mixture for one hour. Filter and dry the resulting solid to get 0.95 g. of title product, M.P. 136–140°. Dissolve the solid in ether containing a small amount of tetrahydrofuran and several drops of pyridine then treat with decolorizing charcoal. Filter and remove the solvent in vacuo. Dissolve the resulting oil in methanol (with several drops of pyridine) and let stand to form large prisms. Filter to obtain 0.75 g. of pure title product, M.P. 138–141°

$\lambda_{max.}^{KBr}$ 5.78μ

Analysis.—Calcd. for $C_{21}H_{30}O_2$ (percent): C, 80.21; H, 9.62. Found (percent): C, 80.31; H, 9.56.

By procedures analogous to those employed above the following compounds are prepared:

dl-13-n-propyl-3-ethoxy-16β-methylgona-2,5(10)-dien-17-one dl-13-n-butyl-3-cyclohexyloxy-16β-methylgona-2,5(10)-dien-17-one dl-13-n-nonyl-3-propoxy-16β-methylgona-2,5(10)-dien-17-one

EXAMPLE 9 dl-13-ethyl-17α-ethynyl-3-methoxy-16α-methylgona-2,5(10)-dien-17β-ol

Dissolve 3.00 g. of dl-13-ethyl-3-methoxy-16β-methylgona-2,5(10)-dien-17-one in 50 ml. of benzene, add 125 ml. of dry dimethylsulfoxide, then bubble purified acetylene gas through the stirred solution for 45 minutes. Add lithium acetylideethylene diamine complex (2.00 g.) and stir the reaction under acetylene for one hour. Add another 2.00 g. of the reagent complex, stir a further one hour then pour the reaction into ice-water. Extract the mixture with ether then wash, dry and evaporate the extract in vacuo. Pump the resulting oil dry under vacuum then scratch with cold hexane and filter to get 1.31 g. of title product, M.P. 83–89°.

EXAMPLE 10 dl-13-ethyl-17α-ethynyl-17β-hydroxy-16α-methylgon-4-en-3-one

Prepare a solution of methanol (90 ml.), concentrated hydrochloric acid (4 ml.) and water (6 ml.) then add dl - 13 - ethyl - 17α - ethynyl-3-methoxy-16α-methylgona-2,5(10)-dien-17β-ol (1.31 g.) and stir for one hour. Add water and extract with ether, then wash, dry and evaporate the extract in vacuo. Dissolve the oil in benzene and pass the solution through a column of fluorosilicate. Remove the benzene in vacuo. Dissolve the resulting oil in a small amount of ether and add hexane then triturate to cause crystallization. Filter to obtain 0.37 g. of the title product, as a solvate, M.P. 91–95°

$\lambda_{max.}^{KBr}$ 3.05 and 6.05μ; $\lambda_{max.}^{EtOH}$ 239 mμ

(E 14,800).

By analogous methods, the following compounds are prepared:

dl-13-n-pentyl-17α-ethynyl-17β-hydroxy-16α-methylgon-4-en-3-one dl-13-n-decyl-17α-ethynyl-17β-hydroxy-16α-methylgon-4-en-3-one dl-13-n-propyl-17α-ethynyl-17β-hydroxy-16α-methylgon-4-en-3-one dl-13-n-butyl-17α-ethynyl-17β-hydroxy-16α-methylgon-4-en-3-one

EXAMPLE 11 dl-13-ethyl-17α-ethynyl-3-methoxy-16β-methylgona-2,5(10)-dien-17β-ol

Equip a flask with stirrer, gas bubbler and condenser with a drierite tube at the outlet then add dry tetrahydrofuran (250 ml.) and 3 M ethereal methyl magnesium bromide (70 ml.). Bubble purified acetylene gas through the stirred solution for 1.5 hours. Add 2.65 g. of dl-13-ethyl-3-methoxy-16β-methylgona-2,5(10)-dien-17-one and reflux the reaction for four hours. Cool and let stand at room temperature overnight. Pour the reaction into 20% aqueous ammonium chloride solution (1500 ml.) then extract with ether. Wash, dry and evaporate the extract in vacuo. Dissolve the oil in hexane, treat with decolorizing charcoal, filter and remove the hexane in vacuo. Dissolve the resulting oil in methanol, let stand then filter the small amount of by-product. Remove the methanol in vacuo, replace with a small amount of methanol then chill and scratch to induce crystallization. Filter the chilled mixture to get 1.58 g. of the title product, M.P. 128–131°

$\lambda_{max.}^{KBr}$ 2.95 and 3.11μ

By analogous methods, the following compound is prepared: dl-13 - n - propyl-17α-ethynyl-3-cyclopentyloxy-16β-methylgona-2,5(10)-dien-17-ol.

EXAMPLE 12 dl-13-ethyl-17α-ethynyl-17β-hydroxy-16β-methylgon-4-en-3-one

Dissolve concentrated hydrochloric acid (4 ml.) and water (6 ml.) in methanol (90 ml.) then add dl-13-ethyl-17α-ethynyl - 3 - methoxy-16β-methylgona-2,5(10)-dien-17β-ol (1.58 g.) and stir at room temperature for 2 hours. Pour the clear solution into brine, extract with ether then wash, dry and evaporate the extract in vacuo. Scratch the oil with ether to crystallize then triturate the solid with 1:1 ether-hexane and filter to get 1.35 g. of the title product, M.P. 163–165°. Obtain an analytical sample from isopropanol-heptane, M.P. 167–169°

$\lambda^{KBr}_{max.}$ 2.98, 3.12 and 6.04μ. $\lambda^{EtOH}_{max.}$ 239 mμ (E 17,100).

*Analysis.*—Calcd. for $C_{22}H_{30}O_2$ (percent): C, 80.93; H, 9.26. Found (percent): C, 80.65; H, 9.02.

By analogous methods, the following compounds are prepared:

*dl*-13-n-propyl-17α-ethynyl-17β-hydroxy-16β-methylgon-4-en-3-one

*dl*-13-n-butyl-17α-ethynyl-17β-hydroxy-16β-methylgon-4-en-3-one

*dl*-13-n-nonyl-17α-ethynyl-17β-hydroxy-16β-methylgon-4-en-3-one

EXAMPLE 13

*dl*-13,17α,diethyl-3-methoxy-16β-methylgona-1,3,5(10)-trien-17β-ol

Pretreat a mixture of 5% palladium on strontium carbonate (1.0 g.) and ethyl acetate (25 ml.) with hydrogen at one atmosphere then add a solution of *dl*-13-ethyl-17α-ethynyl-3-methoxy-16β-methylgona-1,3,5(10)-trien-17β-ol (3.0 g.) in ethyl acetate (150 ml.) and continue treating with hydrogen until uptake of the gas is complete. Filter the solution through filter-aid and evaporate the solvent in vacuo. Treat the residue in methylene chloride with activated charcoal, filter through filter-aid and evaporate the solvent in vacuo. Crystallize the residue from cold ethanol to obtain the title product.

Similarly, in the above reaction for the substrate substitute *dl*-13-ethyl-17α-ethynyl-3-methoxy-16α-methylgona-1,3,5(10)-trien-17β-ol to obtain *dl*-13,17α-diethyl-3-methoxy-16α-methylgona-1,3,5(10)-trien-17β-ol.

EXAMPLE 14

*dl*-13,17α-diethyl-3-methoxy-16β-methylgona-2,5(10)-dien-17β-ol

To a solution of *dl*-13-17α-diethyl-3-methoxy-16β-methylgona-1,3,5(10)-trien-17β-ol (9.20 g.) in dry tetrahydrofuran (250 ml.) and 1-methoxy-2-propanol (160 ml.) add freshly distilled liquid ammonia (1000 ml.) followed by an additional 200 ml. of dry tetrahydrofuran. Stir and add lithium metal (15 g.) in small pieces at a rate to avoid vigorous reflux of the ammonia. Stir for one hour more after complete addition, then add absolute ethanol dropwise until the blue color is discharged. Carefully add ammonium chloride (80.0 g.) in small portions followed by warm water to evaporate the ammonia and bring the mixture to room temperature. Extract with ether then wash, dry and evaporate the extract in vacuo. Triturate the solid with hexane and filter to obtain the title product.

By analogous methods, *dl*-13,17α-diethyl-3-methoxy-16α-methylgona-2,5(10)-dien-17β-ol is obtained.

EXAMPLE 15

*dl*-13,17α-diethyl-17β-hydroxy-16β-methylgon-4-en-3-one

Prepare a solution of methanol (90 ml.), concentrated hydrochloric acid (4 ml.) and water (6 ml.) then add *dl*-13,17α-diethyl-3-methoxy-16β-methylgona-2,5(10)-dien-17β-ol (1.31 g.) and stir for one hour. Add water and extract with ether, then wash, dry and evaporate the extract in vacuo. Dissolve the oil in benzene and pass the solution through a column of fluorosilicate. Remove the benzene in vacuo. Dissolve the resulting oil in a small amount of ether and add hexane then triturate to cause crystallization. Filter to obtain the product.

By analogous methods is obtained *dl*-13,17α-diethyl-17β-hydroxy-16α-methylgon-4-en-3-one.

EXAMPLE 16

*dl*-13-ethyl-17β-hydroxy-16β-methylgon-4-en-3-one

To a solution of methanol (90 ml.), concentrated hydrochloric acid (4 ml.) and water (6 ml.) is added *dl*-13-ethyl-3-methoxy-16β-methylgona-2,5(10)-dien-17β-ol (1.31 g.) and the mixture is stirred for one hour. Water is added and the mixture is extracted with ether, then the product is washed, dried and the solvent is evaporated in vacuo. Dissolve the resulting oil in a small amount of ether and add hexane then triturate to cause crystallization. Filter to obtain the product.

We claim:

1. A process for the production of a compound of the formula

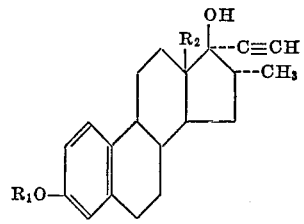

wherein $R_1$ is lower alkyl or cycloalkyl and $R_2$ is polycarbonalkyl, which comprises contacting a compound of the formula

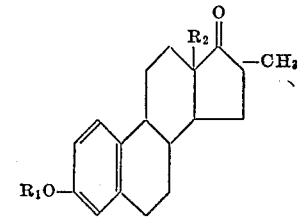

wherein $R_1$ and $R_2$ are the same as hereinabove defined, with lithium acetylide-ethylene diamine complex in dimethyl sulfoxide until the reaction is substantially complete.

2. A process for the production of a compound of the formula

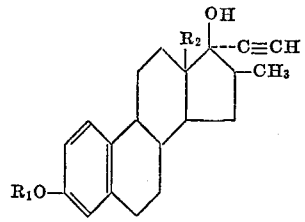

wherein $R_1$ is lower alkyl and $R_2$ is polycarbonalkyl, which comprises contacting a compound of the formula

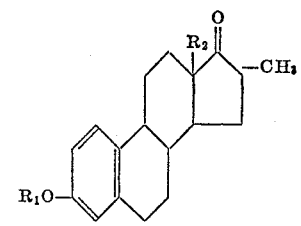

wherein $R_1$ and $R_2$ are the same as set forth above with bismagnesiumbromo acetylide in refluxing tetrahydrofuran until the reaction is substantially complete.

3. A process for the production of a compound of the formula

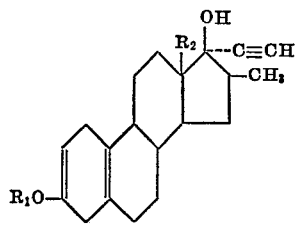

wherein $R_1$ is lower alkyl and $R_2$ is polycarbonalkyl which comprises contacting a compound of the formula

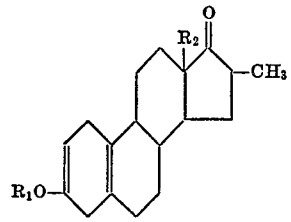

wherein $R_1$ and $R_2$ are the same as hereinabove defined, with bismagnesiumbromo acetylide in refluxing aprotic organic solvent until the reaction is substantially complete.

4. A process for the production of a compound of the formula

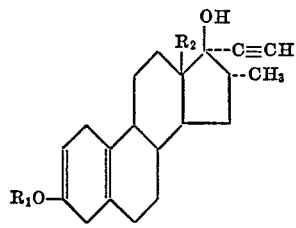

wherein $R_1$ is lower alkyl and $R_2$ is polycarbonalkyl which comprises contacting a compound of the formula

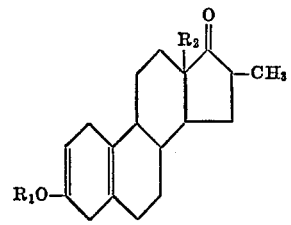

wherein $R_1$ and $R_2$ are the same as hereinabove defined, with lithium acetylide-ethylene diamine complex in dimethylsulfoxide until the reaction is substantially complete.

5. A process for the preparation of a compound of the formula

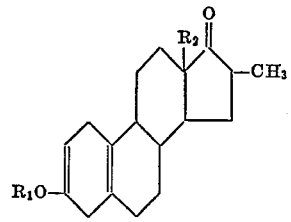

wherein $R_1$ is selected from the group consisting of lower alkyl and cycloalkyl and $R_2$ is polycarbonalkyl, which comprises contacting a compound of the formula

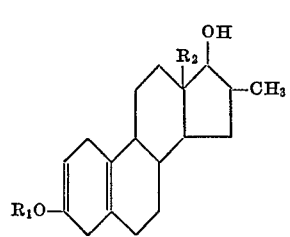

wherein $R_1$ and $R_2$ are the same as hereinabove defined, with acetic anhydride in the presence of dimethylsulfoxide.

References Cited

UNITED STATES PATENTS

| Patent | Date | Inventor | Class |
|---|---|---|---|
| 3,103,521 | 9/1963 | Ringold et al. | 260—397.4 |
| 3,189,528 | 6/1965 | Smith et al. | 195—51 |
| 3,202,686 | 8/1965 | Hughes et al. | 260—397.45 |
| 3,032,564 | 5/1962 | Gould et al. | 260—397.3 |
| 3,092,628 | 6/1963 | Oberster et al. | 260—239.57 |
| 3,158,602 | 11/1964 | Brown et al. | 260—239.55 |

OTHER REFERENCES

Maksimov et al., J.A.C.S., vol. 67, 1170-77e (1967).

HENRY A. FRENCH, Primary Examiner

U.S. Cl. X.R.

260—397.5; 424—243